United States Patent
Tye

(10) Patent No.: US 7,479,514 B2
(45) Date of Patent: Jan. 20, 2009

(54) ADHESION PROMOTING COMPOSITION AND METHOD

(75) Inventor: Anthony Tye, Waterville, OH (US)

(73) Assignee: BASF Corporation, Florham Park, NJ (US)

( * ) Notice: Subject to any disclaimer, the term of this patent is extended or adjusted under 35 U.S.C. 154(b) by 384 days.

(21) Appl. No.: 11/087,957

(22) Filed: Mar. 23, 2005

(65) Prior Publication Data

US 2006/0074163 A1 Apr. 6, 2006

Related U.S. Application Data

(60) Provisional application No. 60/522,477, filed on Oct. 5, 2004.

(51) Int. Cl.
*C08K 5/06* (2006.01)
(52) U.S. Cl. .................. 524/174; 524/175; 524/176; 524/551; 524/558; 526/258; 526/262; 526/292.6; 526/301; 526/302; 526/310
(58) Field of Classification Search ................ 524/174, 524/175, 176, 551, 558; 526/258, 262, 292.6, 526/301, 302, 310
See application file for complete search history.

(56) References Cited

U.S. PATENT DOCUMENTS 3,607,834 A * 9/1971 Marx et al. ................. 524/357
5,214,094 A * 5/1993 Levine et al. ............... 524/560
5,780,525 A 7/1998 Ryang et al.

FOREIGN PATENT DOCUMENTS

| CH | 494271 A | * | 7/1970 |
|----|----------|---|--------|
| DE | 494271   |   | 9/1970 |
| EP | 0 483 974 A1 |   | 9/1991 |
| EP | 483974 A1 | * | 5/1992 |
| GB | 1 144 486 |   | 3/1969 |
| GB | 1144486 A | * | 3/1969 |
| GB | 1 407 003 |   | 9/1975 |
| GB | 1407003 A | * | 9/1975 |
| JP | 10072559 A | * | 3/1998 |

OTHER PUBLICATIONS

The International Search Report and the written opinion of the International Search.

* cited by examiner

*Primary Examiner*—Bernard Lipman

(57) ABSTRACT

An adhesion promoting composition includes a polymer, such as an acrylic copolymer, having acetoacetoxy functionality and adhesion-promoting functionality and a metal alkoxide, chelate, and/or alkoxide chelate. The composition is applied in a first layer over a metal substrate or a coated substrate, then coated with a desired refinish coating composition.

18 Claims, No Drawings

ADHESION PROMOTING COMPOSITION AND METHOD

FIELD OF THE INVENTION

The invention relates to compositions for promoting adhesion over metal substrates or OEM coatings, particularly automotive OEM substrates and coatings, and to processes for coating metal substrates and for refinishing or customizing OEM coatings.

BACKGROUND OF THE INVENTION

Automotive vehicle manufacturers provide an original finish to vehicles that is typically one color overall or a two-tone finish. Sometimes, the original finish will have a contrasting wide stripe around the middle of the vehicle instead of having the two-tone finish of a contrasting color for the top half. There is a market, however, for customized, more colorful finishes, particularly as exterior finishes of vehicles with specially customized interiors, such as customized vans or trucks. More elaborate, customized finishes are provided by after-market refinishers.

Automotive refinish topcoats are generally applied in separate layers of basecoat and clearcoat to provide optimum match to the appearance of the original finish. Unlike the original finish coating compositions, which are typically cured at temperatures of 110° C. or higher, automotive refinish coatings must be formulated as either thermoplastic compositions or thermosetting compositions that cure at relatively low temperatures because many components of a finished vehicle cannot withstand high temperature bakes. Thermosetting refinish compositions, preferred as providing more durable and scratch- and mar-resistant coatings, are usually designed to cure at ambient temperatures, including by oxidation or radiation curing, or at low bakes. Although the coating may not develop full cure for hours or days, it is desirable to have the coating become "dry to handle" (that is, not tacky) within a reasonably short time. Shorter dry to handle times also reduce the chance that the coating could become contaminated with airborne particulates. This is particularly true for clearcoat compositions, which are not covered by other coatings layers and for which a smooth, unblemished surface is critical to obtaining the desired appearance.

For a customized finish, a variety of basecoat colors may be applied, usually in layers of diminishing area, to achieve the desired effect. A clearcoat layer is then applied over the entire vehicle. Adhesion of the refinish coatings to the original finish is critical. Typically, the original finish is scuff-sanded before the refinish coating layers are applied. Scuff-sanding is tedious and time-consuming, especially when the whole exterior of a large vehicle must be sanded, as is the case for customizing the finish of a van or truck. Areas may be missed, resulting in adhesion failure. It would be desirable to overcome this problem. Further, it is necessary, particularly in customizing vehicles, to ensure that the refinish clearcoat adheres well to the original finish.

SUMMARY OF THE INVENTION

The adhesion promoting composition of the invention includes a polymer, which has acetoacetoxy functionality and adhesion-promoting functionality, and a metal alkoxide and/or chelate and/or alkoxide chelate. The polymer is sutiable for an automotive refinish coating; preferably, the polymer is an acrylic copolymer, polyester, polyurethane, epoxy ester, or a combination or graft copolymer of these. The composition is applied in a first layer over a metal substrate or a coated substrate, then coated with a desired refinish coating composition. Generally, the refinish coating composition is a refinish basecoat coating composition or a refinish clearcoat coating composition. The adhesion promoting composition provides excellent adhesion of a refinish coating to either a metal substrate or a coated substrate.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The adhesion promoting composition of the invention includes a polymer with acetoacetoxy functionality and adhesion-promoting functionality, which is preferably selected from acrylic copolymers, polyesters, polyurethanes, epoxy esters, and combinations and graft copolymers of these. In various preferred embodiments, the adhesion promoting composition includes an acrylic copolymer having acetoacetoxy functionality and adhesion-promoting functionality. Each of the acetoacetoxy functionality and the adhesion-promoting functionality may be introduced by reaction of appropriate compounds with acetoacetoxy groups and adhesion promoting groups with an acrylic polymer or by polymerization using monomers having acetoacetoxy groups and adhesion promoting groups. Polymerizing monomers having acetoacetoxy and adhesion promoting groups may be more straightforward. Examples of suitable polymerizable monomers having acetoacetoxy functionality include, without limitation, acetoacetoxyethyl methacrylate, acetoacetoxypropyl methacrylate, acetoacetoxyethyl acrylate, acetoacetoxypropyl acrylate, and so on. Acetoacetoxyalky methacrylate monomers are preferred. As an alternative, acetoacetoxy groups may be introduced into an hydroxyl functional polymer by transesterification with acetoacetoxyester reagents, such as t-butylacetoacetate. In general, a sufficient amount of the acetoacetoxy functionality is included in the acrylic polymer to provide a desired amount of crosslinking of the adhesion promoter layer applied onto the substrate being refinished. One may wish to limit the amount of acetoacetoxy functionality, however, if longer shelf-life of the adhesion promoter composition is desired. The monomer units comprising acetoacetoxy groups are preferably at least about 1% by weight, more preferably at least about 2% by weight, still more preferably at least about 3% by weight, more preferably yet at least about 4% by weight, and particularly preferably at least about 5% by weight, based on the weight of the polymer. With respect to upper levels used of the monomer units comprising acetoacetoxy groups, the monomer units comprising acetoacetoxy groups are preferably up to about 20% by weight, more preferably up to about 15% by weight, still more preferably up to about 10% by weight, more preferably yet up to about 8% by weight, and particularly preferably up to about 7% by weight, based on the weight of the polymer.

Examples of suitable functionalities that may be employed to promote adhesion include, without limitation, hindered secondary amine groups, tertiary amine groups, aziridinyl groups, hydroxyl groups, urea groups, carbamate groups, epoxide groups, silane groups, carbodiimide groups, halogen groups (particularly chloro groups), and combinations of these. Addition polymerizable monomers that may be used to provide such functionalities in the acrylic copolymer include, without limitation, t-butyl amino ethyl methacrylate, dimethylaminopropyl methacrylamide, dimethylaminoethyl methacrylate, ethylene urea ethyl methacrylate (the methacrylic ester of hydroxyethylethylene urea), carbamoylpropyl methacrylate, carbamoylethyl methacrylate, 2-hydroxy-3-carbamoylpropyl methacrylate, 3-hydroxy-2-carbamoylpropyl methacrylate, hydroxyethyl methacrylate, hydroxypropyl methacrylate, hydroxybutyl methacrylate, chloromethylstyrene, and 2-hydroxy-3-chloropropyl methacrylate, aziridinyl ethyl methacrylate, and 3-(trimethoxysilyl)propyl methacrylate. In general, methacrylate monomers or methacrylamide monomers are preferred.

A sufficient amount of the adhesion-promoting functionality is included in the acrylic polymer to provide a desired degree of adhesion of the adhesion promoter composition to the substrate and a desired degree of adhesion of subsequent coating layers to the layer of adhesion promoter composition. Adhesion of subsequent layers may, of course, vary depending on composition of those layers. Particularly when applying refinish automotive coating compositions over the adhesion promoter layer, the monomer units comprising adhesion-promoting groups are preferably at least about 1% by weight, more preferably at least about 2% by weight, still more preferably at least about 3% by weight, more preferably yet at least about 4% by weight, and particularly preferably at least about 5% by weight, based on the weight of the polymer. With respect to upper levels used of the monomer units comprising adhesion-promoting groups, the monomer units comprising adhesion-promoting groups are preferably up to about 20% by weight, more preferably up to about 12% by weight, still more preferably up to about 11% by weight, more preferably yet up to about 8% by weight, and particularly preferably up to about 6% by weight, based on the weight of the polymer.

The acrylic polymer includes one or more further types of monomer units ("comonomers"). The comonomers are preferably selected and apportioned to promote a short tack-free time for the layer of adhesion promoter after application onto the substrate. The glass transition temperature of the polymer should be at least about 20° C., more preferably at least about 45° C., and preferably up to about 100° C., more preferably up to about 80° C.

Preferred comonomers are methacrylate monomers and aromatic vinyl monomers. Among these, it is preferred to include a cycloaliphatic methacrylate and an alkyl methacrylate in which the alkyl group has four or more carbon atoms. Suitable examples of cycloaliphatic methacrylate monomers include, without limitation, cyclohexyl methacrylate, isobornyl methacrylate, tetrahydrofurfuryl methacrylate, 3,3,5-trimethylcyclohexyl methacrylate, 4-t-butylcyclohexyl methacylate, and combinations of these. Suitable examples of alkyl methacrylates in which the alkyl group has four or more carbon atoms include, without limitation, n-butyl methacrylate, isobutyl methacrylate, 2-ethylhexyl methacrylate, lauryl methacrylate, isodecyl methacrylate, t-butyl methacrylate, stearyl methacrylate, tridecyl methacrylate, and combinations of these.

The acrylic polymer may be prepared using conventional techniques, such as by heating the monomers in the presence of a polymerization initiating agent and optionally chain transfer agents. The polymerization is preferably carried out in solution, although it is also possible to polymerize the acrylic polymer in bulk.

Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which a reaction solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes. Suitable polymerization solvents include, without limitation, toluene, xylene, butyl acetate, propylene glycol methyl ether acetate, methyl ethyl ketone, methyl propyl ketone, methyl n-amyl ketone, methyl iso-amyl ketone, ethyl acetate, aromatic 100 solvent, and mixtures of these.

The acrylic polymer weight average molecular weights are preferably at least about 50,000, more preferably at least about 100,000. The polymer number average molecular weights are preferably at least about 30,000, more preferably at least about 40,000, and preferably up to about 80,000, more preferably up to about 60,000.

In various other embodiments of the invention, the adhesion promoting composition includes a condensation polymer having acetoacetoxy functionality and adhesion promoting functionality. Preferred such condensation polymers include, without limitation, polyesters, polyurethanes, and epoxy esters. In general, polyesters are prepared by condensation of dicarboxylic acids with diols, polyurethanes are prepared by reaction of diisocyanates with diols, and epoxy ester resins are prepared by reaction of diepoxides with dicarboxylic acids. It is usually desirable to increase the functionality of the condensation polymers by including a small amount of a monomer having three or more reactive groups (e.g., a tricarboxylic acid or a triol), and/or by polymerizing with a monomer that has a desired functionality that does not participate in the polymerization reaction, and/or by preparing the polymer and then capping (or terminating) the polymer with a compound that provides multiple endgroups. The acetoacetoxy functionality and the adhesion promoting functionality may be added during polymerization by including suitable monomers having acetoacetoxy functionality or adhesion promoting functionality, or may be incorporated onto the polymer by reaction of the polymer with appropriate compounds having acetoacetoxy and adhesion promoting functionality.

For example, acetoacetoxy groups may be introduced into hydroxyl-functional polymers or monomers by transesterification with acetoacetoxyester reagents, such as t-butylacetoacetate. The adhesion promoting functionality of a polyurethane may comprise its urethane linkages. Carbamate groups may be introduced by reaction of hydroxyl groups with an alkyl carbamate compound, or by reaction of an epoxide group with carbon dioxide and then ammonia. Silane groups could be introduced by capping an isocyanate-functional polyurethane with aminosilane.

In addition to the acrylic polymer, the adhesion promoting composition of the invention includes a metal alkoxide and/or chelate and/or alkoxide chelate. The metal alkoxide, chelate, or alkoxide chelate is preferably an aluminum, zirconium, or titanium alkoxide, chelate, or alkoxide chelate, or combination of these. Low color compounds or chelated compounds are generally preferred. Specific examples of suitable compounds include, without limitation, di-sec-alkoxy metal alkoxide chelates such as triisopropyl aluminum alkoxide substituted with pentanedione or another dicarbonyl compound (e.g. an acetoacetate compound)., aluminum di-sec-butoxide ethylacetoacetate chelate, and aluminum di-isopropoxide ethylacetoacetate chelate, aluminum triethylacetoacetonate, titanium tetra-n-butoxide, titanium di-n-butoxide bis-2,4-pentanedioate, titanium diisopropoxide bis(ethylacetoacetate), titanium diisopropoxide bis(2, 4-pentanedioate), zirconium n-butoxide, and zirconium 2,4-pentanedioate.

The amount of the metal alkoxide, chelate, or metal alkoxide chelate compound included in the coating is typically 0.5-20%, based on the non-volatile content of the polymer.

The adhesion promoting composition should include enough solvent to enable application of the thin layer of composition needed on the substrate. The solvent or solvents should be selected to allow the applied composition to dry reasonably quickly so that there is not a long lag time before the refinish coating composition can be applied over the adhesion-promoting composition layer. Preferably, the adhesion promoting composition contains at least about 90 wt. % of organic solvent, and may contain about 95% or more organic solvent in the composition. Suitable solvents include, without limitation, aromatic organic solvents such as xylene and toluene, esters such as butyl acetate and ethyl propionate, and ketones such as methyl propyl ketone and methyl isobutyl ketone.

The adhesion promoting composition preferably includes one or more acetoacetate esters and/or alcohols for stability, for example and without limitation ethyl acetoacetate, t-butylacetoacetate, alcohols such as isopropanol,sec-butanol, n-butanol, n-propanol, ethylene based glycol ethers, propylene based glycol ethers, and combinations of these. The adhesion promoting composition may include other materials as desired, such as (without limitation) silicone additives, flow additives, UV absorbers, hindered amine light stabilizers, antioxidants, alkoxysilane additives such as diethoxy silane, bis(triethoxysilyl)ethane, and triethoxy silyl diethoxy methyl ethane silane, and/or plasticizers such as butyl benzyl phthalate for toughness of the adhesion-promoter coating layer. A pigment or dye could be added, if desired; however, in some cases, such as custom finishing, it may be important to be able to see the original substrate or coating and the composition should, accordingly be essentially colorless.

In one embodiment, the adhesion promoting composition is applied directly over a metal substrate. The dry film may be about 0.1-0.2 mils (about 2.5-5 microns) thick. While the substrate may be any metal, the adhesion promoting composition provides unexpected corrosion protection of aluminum substrates. Other suitable metallic substrates include, for example and without limitation, steel and galvanized steel substrates.

In another embodiment, the adhesion promoting composition is applied over an original finish (OEM finish) on a vehicle. Again, the dry film may be about 0.1-0.2 mils (about 2.5-5 microns) thick. One preferred method of application would include steps of preparing surface, for example by cleaning the surface and scuff sanding the surface; applying a layer of the adhesion promoting composition; flashing the applied layer for about fifteen minutes to allow solvent to evaporate from the applied layer; and then applying at least one layer of a refinish coating composition over the adhesion promoting composition layer. The adhesion-promoting layer has good adhesion even over poorly prepared substrates. The adhesion promoting composition may be taped in one or more areas before application of a first refinish basecoat composition.

In one particular embodiment, a vehicle may be customized by applying the adhesion promoting composition of the invention over all or substantially all of the original coating (which may be prepared by cleaning and scuff sanding), allowing the applied adhesion promoter layer to dry, and taping off a desired portion of the adhesion promoter layer. Then a first, refinish basecoat coating composition having a color different from the original coating finish is applied to a desired area (which may be, for example, all of the area not taped off). If desired, an area of the first basecoat coating layer applied may be taped off, and a further refinish basecoat coating composition having a color different from both the original finish and the first basecoat coating layer may be applied to a desired area that remains not taped off, and so on until all of the desired refinish basecoat layers of the desired colors have been applied. Then, finally, all of the tape is removed and a refinish clearcoat coating composition may be applied over the whole or substantially the whole vehicle.

The invention is illustrated by the following examples. The examples are merely illustrative and do not in any way limit the scope of the invention as described and claimed. All parts are parts by weight unless otherwise noted.

EXAMPLE 1

Polymer Solution

A polymer was prepared by first charging a reaction vessel, fitted with an agitator, condenser, inert gas inlet, and thermocouple, with 20.25 parts by weight toluene and heating the solvent to 85° C. A monomer mixture was prepared with cyclohexyl methacrylate, 24.11 parts by weight, isobutyl methacrylate, 11.57 parts by weight, acetoacetoxy ethyl methacrylate, 2.89 parts by weight, t-butylaminoethyl methacrylate, 1.53 parts by weight, n-butyl acrylate, 1.25 parts by weight, and toluene, 3.68 parts by weight. An initiator mixture was prepared with 2,2'-azobis(methylbutyronitrile), 0.10 parts by weight, and toluene, 9.20 parts by weight. With the reaction vessel under inert gas and held at 85° C., half of the monomer mixture (by weight) was added over 1 hour and one-third of the initiator solution (by weight) was added over 2 hours (the first hour concurrently, to the reaction vessel with agitation. The reaction mixture was then held for a period of 30 minutes at 85° C. The remainder of the monomer mixture and the remainder of the initiator mixture were added concurrently over 2 hours to the reaction vessel, still held at 85° C. The reaction mixture was then held at 85° C. for another hour following the add. After the hold, a second initiator mixture of 2,2'-azobis(methylbutyronitrile), 0.02 parts by weight, and toluene, 1.47 parts by weight, was added to the reaction mixture over 15 minutes at 85° C. A conversion period of 2 hours followed at the same temperature. The polymer solution was then adjusted to about 43% by weight non-volatile by the addition of 23.93 parts by weight of toluene. The resultant acrylic copolymer had a solution viscosity of Z-Z$_1$ (Gardner-Holt) and a MW$_n$ of 60,000.

EXAMPLE 2

Adhesion Promoting Composition

An adhesion promoting composition was prepared by combining the polymer solution from Example 1, 9.35 parts by weight, with xylene, 77.53 parts by weight, isopropanol, 8.09 parts by weight, butylbenzyl phthalate, 0.40 parts by weight, aluminum di-sec-butoxide acetoacetic ester chelate, 0.40 parts by weight, and ethyl acetoacetate, 4.22 parts by weight. The resultant mixture had a viscosity of 16-18 seconds Ford #4 efflux cup.

The adhesion promoting composition of Example 2 is applied via air atomization over a substrate in one light coat, resulting in a dry film thickness of 0.2-0.5 mils. The applied film is allowed to dry for at least 15 minutes before top coating with an automotive refinish color coat.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adhesion promoting composition, consisting of:
   a solvent;
   a polymer comprising acetoacetoxy functionality and an adhesion-promoting functionality selected from the group consisting of a hindered secondary amine group, a tertiary amine group, an aziridinyl group, a urea group, a carbamate group, a carbodiimide group, a halogen group, and a combination thereof;
   a metal alkoxide, metal chelate, metal alkoxide chelate, or a mixture thereof;
   optionally, an alcohol, an acetoacetate ester, and a combination thereof; and
   optionally, an additive selected from the group consisting of a silicone, a flow additive, a UV absorber, a hindered amine light stabilizer, an antioxidant, an alkoxysilane, a plasticizer, a pigment, a dye, and a combination thereof.

2. The adhesion promoting composition of claim 1, wherein the polymer is an acrylic copolymer.

3. The adhesion promoting composition of claim 2, wherein the acrylic polymer comprises from about 1% to about 20% by weight of monomer units comprising the acetoacetoxy functionality.

4. The adhesion promoting composition of claim 1, wherein the adhesion-promoting functionality is selected from the group consisting of a hindered secondary amine groups, a tertiary amine groups, and combinations thereof.

5. The adhesion promoting composition of claim 2, wherein the acrylic polymer comprises from about 1% to about 15% by weight of monomer units comprising the adhesion-promoting functionality.

6. The adhesion promoting composition of claim 2, wherein the acrylic polymer has a glass transition temperature of at least about 20° C.

7. The adhesion promoting composition of claim 2, wherein the acrylic polymer has a weight average molecular weight of at least about 50,000.

8. The adhesion promoting composition of claim 1, wherein the metal alkoxide, metal chelate, metal alkoxide chelate, or mixture thereof comprises a member selected from the group consisting of aluminum alkoxides, zirconium alkoxides, titanium alkoxides, aluminum alkoxide chelates, zirconium alkoxide chelates, titanium alkoxide chelates, and combinations thereof.

9. The adhesion promoting composition of claim 2, wherein the acrylic polymer comprises monomer units of a cycloaliphatic methacrylate and an alkyl methacrylate in which the alkyl group has four or more carbon atoms.

10. An adhesion promoting composition according to claim 1, wherein the polymer is a condensation polymer.

11. An adhesion promoting composition according to claim 1, wherein the polymer is polyurethane and the adhesion promoting functionality comprises its urethane linkages.

12. A method of coating a substrate, comprising steps of:
   (a) applying a layer of an adhesion promoting composition comprising
      (i) a polymer comprising acetoacetoxy functionality and an adhesion-promoting functionality selected from the group consisting of a hindered secondary amine group, a tertiary amine group, an aziridinyl group, a urea group, a carbamate group, a carbodiimide group, a halogen group, and a combination thereof; and
      (ii) a metal alkoxide and/or alkoxide chelate; and
   (b) applying over the layer of adhesion promoting composition a layer of a refinish coating composition.

13. A method according to claim 12, wherein the layer of adhesion promoting composition is applied directly to a metal substrate.

14. A method according to claim 13, wherein the metal substrate is an aluminum substrate.

15. A method according to claim 12, wherein the layer of adhesion promoting composition is applied to a coated substrate.

16. A method according to claim 12, wherein the refinish coating composition applied in step (b) is a refinish basecoat coating composition.

17. A method according to claim 12, wherein a refinish clearcoat coating composition is applied over at least a portion of the layer of adhesion promoting composition.

18. An adhesion promoting composition, consisting of:
   a solvent;
   a polymer comprising aceotacetoxy functionality and an adhesion-promoting functionality selected from the group consisting of a hindered secondary amine group, a tertiary amine group, an aziridinyl group, a urea group, a carbamate group, a carbodiimide group, a halogen group, and a combination thereof;
   a metal alkoxide, metal chelate, metal alkoxide chelate, or a mixture thereof
   an alcohol, an acetoacetate ester, and a combination thereof; and
   an additive selected from the group consisting of a silicone, a flow additive, a UV absorber, a hindered amine light stabilizer, an antioxidant, an alkoxysilane, a plasticizer, a pigment, a dye, and a combination thereof.

* * * * *